United States Patent [19]

Akiyama

[11] Patent Number: 4,741,705

[45] Date of Patent: May 3, 1988

[54] CONNECTOR APPARATUS FOR ANTENNA TERMINAL OF TELEVISION RECEIVER

[75] Inventor: Tsuneo Akiyama, Yokohama, Japan

[73] Assignee: Shintom Kabushiki Kaisha, Kanagawa, Japan

[21] Appl. No.: 866,580

[22] Filed: May 22, 1986

[30] Foreign Application Priority Data

May 22, 1985 [JP] Japan .............................. 60-75040[U]

[51] Int. Cl.[4] ........................................... H01R 11/22
[52] U.S. Cl. .................................... 439/270; 439/592; 439/639; 439/581
[58] Field of Search ...................... 339/177, 252 P, 74, 339/59-63, 154-157; 439/270

[56] References Cited

U.S. PATENT DOCUMENTS

| | | | |
|---|---|---|---|
| 2,918,647 | 12/1959 | Britt | 339/74 R |
| 3,281,754 | 10/1966 | Cadwallader | 339/61 R |
| 3,622,945 | 11/1971 | Winston | 339/177 R |
| 3,649,742 | 3/1972 | Tissot | 339/63 R |
| 4,030,796 | 6/1977 | Patzer | 339/61 R |
| 4,569,567 | 2/1986 | Zucchini | 339/154 A |

Primary Examiner—Gil Weidenfeld
Assistant Examiner—David Pirlot
Attorney, Agent, or Firm—Bruce L. Adams; Van C. Wilks

[57] ABSTRACT

A connector apparatus for introducing video signals of an alternative video signal source to antenna terminals in the form of a pair of screw rods that are spaced apart from each other and provided on the back surface of a television receiver.

The connector apparatus is provided with a housing, means for receiving the end of a coaxial cable extending from the alternative video signal source to introduce the outer conductor and the inner conductor of the coaxial into the housing, a pair of lead members comprising electric conductors and having free ends extending outwardly from the housing, and means for connecting one end of each of the lead members to the inner conductor and the outer conductor of the coaxial cable. The lead members comprise resilient electric conductors, their free ends are spaced apart from each other in appearance greater than the distance between the antenna terminal rods, and when the free ends are inserted forcibly between the rods, they engage with the corresponding antenna rods resiliently and frictionally.

6 Claims, 1 Drawing Sheet

CONNECTOR APPARATUS FOR ANTENNA TERMINAL OF TELEVISION RECEIVER

FIELD OF THE INVENTION

The present invention relates to a cable assembly for operationally connecting a television receiver and a video accessory with each other, and particularly to a connector apparatus that is provided to the end of a coaxial cable extended from a video accessory for connecting the coaxial cable to antenna terminals of a television receiver.

BACKGROUND OF THE INVENTION

Video accessories such as a video tape recorder (VTR), a video disk player (VDP) and a video game are increasingly used as alternative program sources for television receivers. A television receiver can receive local signals from these alternative program sources instead of broadcast signals received via an antenna. When an alternative program source is to be introduced to a television receiver, the connection of an antenna and antenna terminals of the receiver has to be changed to the connection of the antenna terminals and a coaxial cable extending from the video accessory. When a video accessory is installed permanently, this change is, generally, performed by a mechanical or electronic antenna switch. An example of such an electronic antenna switch is disclosed in U.S. Pat. No. 4,424,591.

However, when the use of a video accessory is temporary, for example when a rental video accessory is used, feeder lines that are extended from an antenna and are connected to antenna terminals of a television receiver are removed, and instead, end fittings of a connecting cable assembly extending from a video accessory are attached to the antenna terminals. Further, when the video accessory is disconnected from the television receiver, the reverse procedure is required. The connecting cable assembly attached to a rental video accessory is required to be durable and easy to handle because its attachment to and detachment from antenna terminals is frequently repeated. The prior art connecting cable assembly is provided with a relatively long coaxial cable having at one end a video connector fittable to an RF-OUT socket of a video accessory, relatively flat and parallel feeder lines having a pair of Y-shaped jacks to be connected to antenna terminals of a television receiver, and a relay for electrically connecting the other ends of the coaxial cable and the other ends of the feeder lines to each other. When it is used, on the one hand the video connector is attached to the socket of the video accessory, on the other hand screws of the antenna terminals of the receiver are loosened, the antenna feeder lines are removed from the terminals, and instead, the Y-shaped jacks of the feeder lines extending from the relay are attached. The attaching and detaching of the Y-shaped jacks is troublesome, and further since disconnection is liable to occur at the connected part of the Y-shaped jacks and the feeder lines, the prior art connecting cable assembly for alternative program sources has been unsatisfactory.

SUMMARY OF THE INVENTION

The object of the present invention is to provide a connecting cable assembly by which the operational connection of a television receiver and a video accessory can be quite easily performed.

In particular, the object of the present invention is to provide a connector apparatus suitable to introduce local signals of alternative program sources to antenna terminals of a television receiver.

According to the present invention, there is provided a connector apparatus for introducing local signals of an alternative program source to antenna terminals in the shape of a pair of screw rods spaced apart and provided on the back surface of a television receiver, the connector apparatus comprising a housing, means for receiving the end of a coaxial cable extending from the alternative program source to introduce the inner conductor and the outer conductor of the coaxial cable into the housing, a pair of lead members comprising resilient conductors with one end supported in the housing and other free ends extending outwardly from the housing, and means for connecting one end of each of the pair of lead members to the inner conductor and the outer conductor of the coaxial cable respectively, the free ends of the lead members being spaced apart in appearance greater than the distance between the rods of the antenna terminals so that when the free ends are inserted forcibly between the rods, the free ends can resiliently and frictionally engage with the corresponding rods.

According to a preferred embodiment of the present invention, the apparatus can be assembled in such a manner that one end of the pair of lead members is secured to a common support member, and the common support member is attached to the housing. In this case, the common support member includes reinforcing sleeve sections surrounding major portions of the lead members except the free end sections, and these sleeve sections can be deformed together with the lead members resiliently.

BRIEF DESCRIPTION OF DRAWINGS

FIG. 1 is a plane view of the inventive cable assembly for connecting alternative program sources to antenna terminals.

FIG. 2 is a cross-sectional view of the inventive cable assembly taken along line 2—2 of FIG. 1.

DESCRIPTION OF PREFERRED EMBODIMENT

Figures 1, 2:
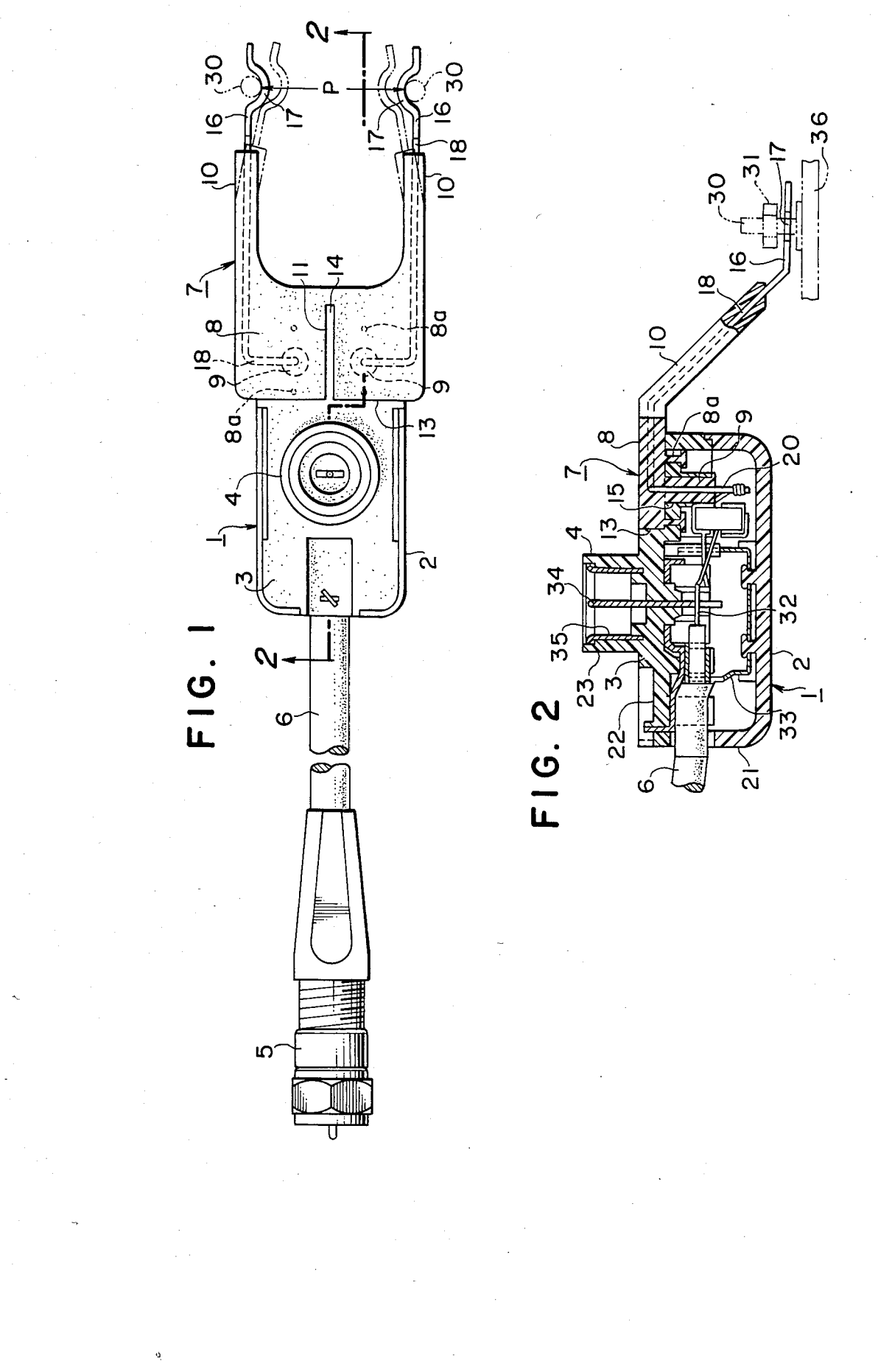

Referring to FIG. 1, a connecting cable assembly includes a connector apparatus generally by numeral 1 and a coaxial cable 6 of which the one end is connected to the connector apparatus 1. Although the coaxial cable 6 is shown in the figure with part broken away, it is relatively long. The other end of the coaxial cable 6 has a video connector 5 of a known type fittable to an RF-OUT terminal socket (not shown) provided to a video accessory or video signal source (not shown) having an alternative program source. The connector apparatus 1 includes a housing 2 in the shape of a rectangular closed box and a common support member 7 attached to the housing and carrying or supporting a pair of longitudinal lead members 18. The common support member 7 includes a flat plate section 8 supporting the lead members 18 and a pair of sleeve sections 10 extending from the plate section 8 that surround major portions of the lead members 18 except free end sections 16 of the lead members 18.

Now referring to FIG. 2, the plate section 8 of the common support member 7 carries a pair of posts 9 extending downward from the undersurface of the plate section 8 for guiding and fixing one end 20 of the lead members 18 through the posts 9 into the housing 2. The closed housing 2 consists of a pair of a lower half portion 2 and an upper half portion 22 of a synthetic resin material, and the upper half 22 has a top plate member 3. The top plate member 3 has a cut surface section 13 where the plate section 8 of the common support member 7 is mounted. The plate section 8 is formed with a positioning slit 11 at its central section that engages with a rib 14 extending from the cut surface section 13 of the top plate 3 and has a plurality of pin sections 8a extending downward from its undersurface. The cut surface section 13 of the top plate 3 has holes for receiving the lead member guide posts 9 and the pin sections 8a extending from the undersurface of the plate section 8, and thus by engaging the respective parts with the holes, the common support member 7 is secured to the housing 2. The heads of the pin sections 8a are pressed down to prevent the common support member 7 from dropping from the housing 2.

One end of the coaxial cable 6 is led into the housing 2 and the inner conductor 32 and the outer conductor 33 are exposed from the end in a known manner. The inner conductor 32 and the outer conductor 33 are electrically interconnected respectively to fixed ends 20 of the lead members 18 led into the housing 2 through the guide posts 9 of the common member 7. In practice, the electrical connection is made in any known manner, and therefore, for example, in the lower half portion 21 of the housing 2, the forward ends of the inner conductor 32 and the outer conductor 33 can be soldered respectively to the ends 20 of the lead members 18, which is not shown in the drawings in detail.

The pair of lead members 18 whose ends are carried by the common support member 7 are passed through the sleeve sections 10 that are in parallel and are extended downwardly outward from the plate section 8, and the free ends 16 of the lead members 18 are projected from the sleeve sections 10 to be exposed. The lead members 18 are made of an electrically conductive material that is resiliently or deflectable and is high in restoring force. The free ends 16 of the lead members 18 have arcuate sections 17 whose convexes are opposed to each other, and the arcuate sections 17 can engage with antenna terminal screw rods 30 provided on and protruding substantially vertically from a back panel or wall 36 of a television receiver. The engagement can be attained by forming the lead members 18 such that the substantial distance between the lead members 18, that is, the apparent distance or interval between the arcuate sections 17 of the free ends 16 is larger than the distance P between the pair of antenna terminals 30 of the display device in the form of the television receiver. Namely, when the pair of lead members 18 are inserted between the antenna terminals 30 of a television receiver along the back panel 36, the pair of lead members 18 and, if required, the pair of sleeve sections 10 are manually pushed toward each other to be resiliently deformed, and then they are released, the lead members 18 engage with the antenna terminals 30 respectively due to the resilient restoring force, resulting in the electrical connection therebetween. The release of this engagement can be carried out in the opposite manner.

Since most antenna terminals of television receivers are of the screw type consisting of nuts 31 and the screw rods 30 as mentioned above, the present connector apparatus 1 can be applied generally. However, to permit the present connector apparatus 1 to be optionally fitted to recent television receivers having a plug-connector type antenna terminal together with a screw type terminal instead of having only one screw type terminal, the present connector apparatus 1 can have additionally a female plug or socket means cooperable with such a plug-connector type antenna terminal. A female plug or socket means is designated generally by a numeral 4 and is formed by a cylindrical section 23 provided on the upper half portion 22 of the housing 2, and the cylindrical section 23 has therein an inner conductor terminal 34 and an outer conductor terminal 35 that are known per se and are to be connected electrically to a male plug type antenna terminal (not shown) of a television receiver. The inner conductor terminal 34 and the outer conductor terminal 35 are connected electrically to the inner conductor 32 and the outer conductor 33 of the coaxial cable 6 in the housing 2 respectively.

What is claimed is:

1. A connector apparatus for electrically connecting a coaxial cable having inner and outer conductors and extending from an alternative program source to antenna terminals comprised of a pair of rods spaced apart from each other and provided on the back of a television receiver, said connector apparatus comprising:

a housing;

means disposed in the housing and connected to the end of the coaxial cable extending from said alternative program source for introducing the inner conductor and the outer conductor of said coaxial cable into said housing;

a pair of lead members composed of resilient electric conductors, each of the lead members having one end extended into said housing and the other free end extended from said housing;

means for operationally connecting the one ends of said pair of lead members to the inner conductor and the outer conductor, respectively, of said coaxial cable;

a common support member for supporting said pair of lead members, said common support member being attached to said housing and introducing the one ends of said pair of lead members into said housing, and further having a pair of sleeves, said sleeves being in parallel with each other and extended downwardly outward from one end of the top surface of the housing, and surrounding major portions of said lead members excluding their free ends, said sleeves being resiliently deflectable together with the lead members, the free ends of said lead members being spaced apart a distance greater than the distance between the rods of said antenna terminals so that when said free ends are inserted forcibly between said antenna terminals, said free ends can resiliently and frictionally engage with the corresponding antenna terminals thereby establishing the electrical connection therebetween; and a socket section provided on said housing, said socket section including therein an outer terminal and an inner terminal electrically connected respectively to the inner conductor and the outer conductor of said coaxial cable so that said socket section can be optionally connected to connector type antenna terminals provided on the back of a television receiver.

2. A connector apparatus as claimed in claim 1; wherein said lead members have respective arcuate sections at the free ends thereof, said arcuate sections being engageable with the antenna terminals provided on the back of said television receiver.

3. A connector apparatus for use in electrically connecting a coaxial cable comprised of inner and outer electrical conductors to a pair of input terminals disposed in spaced relation to each other and protruding substantially vertically from a wall of a display device, the connector apparatus comprising: a housing; a pair of longitudinal lead members, each lead member having a fixed end portion fixed inside the housing and a free end portion extending outwardly from the housing, the pair of free end portions being normally spaced apart from each other during non-use of the connector apparatus a distance larger than the distance between the pair of input terminals and being resiliently deflectable inwardly relative to each other when positioned along the wall of the display device between the input terminals during use of the connector apparatus to thereby firmly engage with the input terminals due to the restoring resiliency of the lead member free end portions against the input terminals; supporting means mounted on the housing for supporting the lead members, the supporting means having a pair of sleeves covering the lead members along the length thereof but not covering their free end portions; receiving means disposed inside the housing for receiving the coaxial cable; interconnecting means disposed inside the housing for electrically interconnecting the inner and outer electrical conductors of the received coaxial cable to respective ones of the pair of fixed end portions of the lead members; and a socket member disposed on the housing and comprised of outer and inner terminals electrically interconnected to the inner and outer conductors of the received coaxial cable respectively, the socket member being engageable with plug-connector-type antenna terminals mounted on a television receiver.

4. A connector apparatus as claimed in claim 3; wherein each lead member free end portion has an inwardly arcuate shape configured to conform to an input terminal in the form of an antenna terminal rod mounted on a television receiver.

5. A connector apparatus as claimed in claim 3; wherein the housing comprises a substantially rectangular closed box having a front side from which the coaxial cable is received inside the box, and a rear side from which the lead members extend outwardly and rearwardly.

6. A connector apparatus as claimed in claim 3; wherein the lead member free end portions are disposed in spaced, substantially parallel relation with each other.

* * * * *